United States Patent
Long

(10) Patent No.: US 11,043,321 B2
(45) Date of Patent: Jun. 22, 2021

(54) METHOD AND ASSEMBLY FOR PRODUCING A MAGNET

(71) Applicant: Wisk Aero LLC, Mountain View, CA (US)

(72) Inventor: Geoffrey Alan Long, Montara, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/779,411

(22) Filed: Jan. 31, 2020

(65) Prior Publication Data

US 2020/0176161 A1 Jun. 4, 2020

Related U.S. Application Data

(63) Continuation of application No. 15/398,300, filed on Jan. 4, 2017, now Pat. No. 10,586,639.

(51) Int. Cl.
*H01F 7/02* (2006.01)
*H02K 15/03* (2006.01)

(52) U.S. Cl.
CPC .............. *H01F 7/021* (2013.01); *H02K 15/03* (2013.01)

(58) Field of Classification Search
CPC ................................ H01F 7/021; H02K 15/03
See application file for complete search history.

(56) References Cited

U.S. PATENT DOCUMENTS

| 5,181,971 A | 1/1993 | Ohtsuka |
| 6,841,910 B2 | 1/2005 | Gery |
| 7,021,587 B1 | 4/2006 | Younkin |
| 8,853,906 B2 | 10/2014 | Harrell et al. |
| 9,231,309 B2 | 1/2016 | Dede et al. |
| 9,312,057 B2 | 4/2016 | Martinek et al. |
| 10,586,639 B2 * | 3/2020 | Long ............... H02K 15/03 |

(Continued)

FOREIGN PATENT DOCUMENTS

| CN | 101816117 | 8/2010 |
| CN | 102044921 | 5/2011 |

(Continued)

OTHER PUBLICATIONS

EP17889616.3, "Partial Supplementary European Search Report", dated Jul. 6, 2020, 15 pages.

(Continued)

*Primary Examiner* — Jue Zhang
(74) *Attorney, Agent, or Firm* — Kilpatrick Townsend & Stockton LLP

(57) ABSTRACT

Method and assembly for producing a magnet. A method of manufacturing a magnet includes transferring magnetic powder into a die cavity. The die cavity has a first side and a second side opposite to the first side. First magnetic flux lines are induced to extend into the magnetic powder through the first side and orthogonal to the first side. The first magnetic flux lines extend out of the magnetic powder through a top surface of the magnetic powder. Second magnetic flux lines are induced to extend into the magnetic powder through the second side and orthogonal to the second side. The second magnetic flux lines extend out of the magnetic powder through the top surface of the magnetic powder. Pressure is applied to the magnetic powder disposed within the die cavity.

20 Claims, 13 Drawing Sheets

(56) References Cited

U.S. PATENT DOCUMENTS

| | | |
|---|---|---|
| 2005/0195058 A1 | 9/2005 | Maurer et al. |
| 2008/0088200 A1 | 4/2008 | Ritchey |
| 2009/0072639 A1 | 3/2009 | Seneff et al. |
| 2011/0088249 A1 | 4/2011 | Stephens et al. |
| 2012/0248917 A1 | 10/2012 | Petro et al. |
| 2013/0000206 A1 | 1/2013 | O'Kane et al. |
| 2013/0002066 A1 | 1/2013 | Long |
| 2013/0278102 A1 | 10/2013 | Levy |
| 2013/0328453 A1 | 12/2013 | Duncan et al. |
| 2015/0089794 A1 | 4/2015 | Dokonal et al. |
| 2015/0132104 A1 | 5/2015 | Long et al. |
| 2015/0229194 A1 | 8/2015 | Sromin |
| 2016/0329795 A1 | 11/2016 | Ricci et al. |
| 2017/0098972 A1 | 4/2017 | Vann |
| 2018/0190417 A1 | 7/2018 | Long |
| 2018/0191215 A1* | 7/2018 | Long .................... H02K 1/2793 |

FOREIGN PATENT DOCUMENTS

| | | |
|---|---|---|
| CN | 104163241 | 11/2014 |
| CN | 104718133 | 6/2015 |
| CN | 104163241 B | 3/2016 |
| DE | 10235171 B3 | 1/2004 |
| EP | 2312732 | 4/2011 |
| JP | 2004328927 A | 11/2004 |
| JP | 2007215292 | 8/2007 |
| JP | 2013247721 A | 12/2013 |
| WO | 2013087056 A2 | 6/2013 |
| WO | 2017058458 A1 | 4/2017 |

OTHER PUBLICATIONS

NZ753383, "Office Action", dated Mar. 3, 2020, 4 pages.
EP17889541.3, "Extended European Search Report", dated May 6, 2020, 8 pages.
NZ753663, "First Examination Report", dated Feb. 27, 2020, 5 pages.
Yaskawa Application Note, "AC Permanent Magnet Motor Control", Applicable Product: V1000, Available online at: www.yaskawa.com, Jan. 28, 2009, 12 pages.
Arnold Magnetics, "Shaped Field Magnets", Availale online at: https://web.archive.org/web/20160119034728/http://www.arnoldmagnetics.com/en-us/Products/Shaped-Field-Magnets, Jan. 19, 2016, 25 pages.
U.S. Appl. No. 15/398,300, "Non-Final Office Action", dated Jun. 19, 2019, 12 pages.
U.S. Appl. No. 15/398,300, "Notice of Allowance", dated Oct. 30, 2019, 8 pages.
U.S. Appl. No. 15/398,325, "Non-Final Office Action", dated May 14, 2019, 10 pages.
U.S. Appl. No. 15/398,344, "Final Office Action", dated Dec. 30, 2019, 14 pages.
U.S. Appl. No. 15/398,344, "Non-Final Office Action", dated Mar. 28, 2019, 15 pages.
PCT/US2017/062084, "International Preliminary Report on Patentability", dated Jul. 18, 2019, 7 pages.
PCT/US2017/062084, "International Search Report and Written Opinion", dated Feb. 5, 2018, 8 pages.
PCT/US2017/062087, "International Preliminary Report on Patentability", dated Jul. 18, 2019, 9 pages.
PCT/US2017/062087, "International Search Report and Written Opinion", dated Mar. 9, 2018, 12 pages.
Application No. CN201780075040.4 , Office Action, dated Jul. 1, 2020, 25 pages.
Application No. CN201780075066.9 , Office Action, dated Jul. 6, 2020, 10 pages.
EP17889616.3 , "Extended European Search Report", dated Sep. 23, 2020, 15 pages.
NZ753663 , "Second Examination Report", dated Aug. 21, 2020, 5 pages.

* cited by examiner 1140.1

1150.1

1140.2

1150.2

1140.3

1150.3

METHOD AND ASSEMBLY FOR PRODUCING A MAGNET

CROSS-REFERENCE TO RELATED APPLICATIONS

This application is a continuation of U.S. Non-Provisional application Ser. No. 15/398,300, filed Jan. 4, 2017, titled "Array of Three Pole Magnets" which is incorporated by reference in its entirety for all purposes.

BACKGROUND OF THE INVENTION

Magnets are useful for a variety of applications such as magnet arrays for electric motors. For example, one type of electric motor is a surface permanent magnet motor in which a rotor is implemented by an array of alternating pole magnets or a Halbach array. Ideally, the magnet array has a concentrated magnetic field on one side of the magnet array and substantially no magnetic field on the other side of the array. However, current magnet arrays are unable to shape magnetic fields in this manner. Currently, the manufacture of magnets and magnet arrays is complex and costly, and the magnets may be inefficient and do not always perform as desired.

BRIEF DESCRIPTION OF THE DRAWINGS

Various embodiments of the invention are disclosed in the following detailed description and the accompanying drawings.

DETAILED DESCRIPTION

Figure 1A:
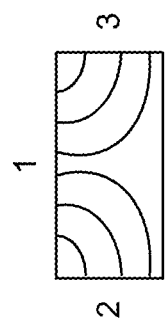
FIG. 1A is a diagram of an embodiment of a three pole magnet.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to provide a three-pole magnet, an array of three pole magnets, a method of making a three pole magnet, and a method of making an array of magnets are disclosed. For example, an array of magnets includes a plurality of three-pole magnets arranged in an array in which each three-pole magnet comprising the array is adjacent to one or more other three-pole magnets comprising the array. At least one of the three-pole magnets comprises: a first surface comprising a first magnetic pole having a first magnetic polarity, a second surface that is adjacent to and at least partly orthogonal to the first surface and which comprises a second magnetic pole having a second magnetic polarity that is opposite the first magnetic polarity, and a third surface that is adjacent to the first surface at an end substantially opposite the second surface and which comprises a third magnetic pole having the second magnetic polarity.

In magnet manufacture, there is frequently a tradeoff between manufacturing complexity (e.g., cost) and performance. Techniques disclosed herein address this tradeoff by achieving high performance with lower cost and complexity compared with typical magnet and magnet array manufacture processes. Also disclosed herein are magnets and magnet arrays with improved performance compared with typical magnets and magnet arrays. Consequently, electric motors and machines using the magnets and magnet arrays disclosed herein are improved.

Conventional manufacture of magnets involves starting with a large block of isostatically pressed powder, sintering to solidify the block and to lock in a uniform magnetization direction, dicing up the large block, machining or grounding the magnet to the finished size, finishing the surface, and magnetizing the magnet. The resulting magnet has a magnetization direction that is substantially uniform in orientation throughout the interior of the magnet. When such a magnet is used in a Halbach array to provide a brushless motor, the uniform orientation of the magnetic field results in wasted energy because there is still some field on both sides of the array. It is the magnetic field that is located on the side of the magnet array near a stator that interacts with the field generated by the stator to produce the force that causes the rotor to rotate. The magnetic field on the side of the magnet array opposite the stator is wasted.

In a typical magnetizing process, a magnetic field develops around solenoid windings (coils), then expands and decays with time. For each point in the magnet, a magnetic field of a certain strength is needed to force the magnetic domains to align. In particular, the pulse reaching a central region of a magnet should have sufficient amplitude to align the domains there. Typical materials used to create magnets have a single easy axis in which the grains are aligned. The easy axis is an energetically favorable direction of magnetization such that the material can be magnetized in one direction or the other along the easy axis but generally not along any other axis.

The type and size of the material can pose challenges for magnetization. For example, when there is a large area to be magnetized, eddy currents slow propagation of the magnetizing field into that area. Effectively, this means that a relatively large piece of material needs a relatively strong magnetic field to be magnetized. For many applications, there are physical limitations to the strength of magnetic field that is capable of being produced.

In contrast to typical magnets, which have a uniform magnetization direction throughout the magnet, in various embodiments magnets disclosed here have optimally oriented magnetization directions throughout the magnet. For example, the sintered grains of the magnet cause the magnet to have a magnetic field like that of a Halbach array. For example, at least a majority of the magnetic field enters through the top side of the array and leaves through the adjacent sides, or vice versa, and less than a majority of the magnetic field is on the bottom side of the array. The development of the magnetic field in various embodiments is described here with respect to FIG. 3. In some embodiments, an array made of magnets described here may have better performance than a Halbach array because there are fewer harmonics relative to a Halbach array. That is, a magnetic field of a magnet array fabricated in accordance with techniques described herein may have a more ideal sinusoidal shape than that of a traditional Halbach array or alternating pole magnet array. For example, the field that would be in those wasted higher spacial harmonics in a Halbach array is moved into a larger fundamental spacial harmonic due to the more ideal magnetization direction distribution within the magnets.

FIG. 1A is a diagram of an embodiment of a three pole magnet. The magnet shown in FIG. 1A has three poles, labelled 1, 2, and 3. The lines shown in the magnet are example easy axis lines along which grains are aligned. An easy axis is an energetically favorable direction of magnetization such that the material can be magnetized in one direction or the other along the easy axis. In the example shown in FIG. 1A, the three pole magnet is capable of becoming magnetized along axis line 1 to 2 and along axis line 1 to 3.

The magnet shown in FIG. 1A has substantially all of the field coming into (or out of) the top surface (pole 1). The field splits substantially evenly and goes out of (or into) two other surfaces (poles 2 and 3). In some embodiments, there is a fourth surface that has a negligible amount of field coming in or going out. In FIG. 1A, the fourth surface is the bottom surface of the magnet.

Figure 1B:
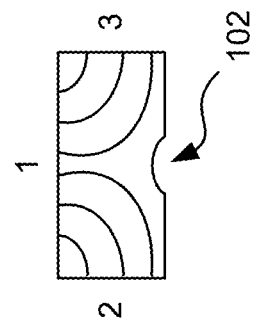
FIG. 1B is a diagram of an embodiment of a three pole magnet.

FIG. 1B is a diagram of an embodiment of a three pole magnet. The magnet shown in FIG. 1B includes three poles, labelled N (north), S (south), and S (south). The magnet shown in FIG. 1B behaves like the magnet shown in FIG. 1A. As shown, there is one north pole surface and two south pole surfaces. Alternatively, the magnet may have two north pole surfaces and one south pole surface (not shown). In this example, substantially all of the field coming into (or out of) the north pole, splits about evenly and goes out of the south poles. The bottom surface has a negligible amount of field going out (or coming in). This magnetic field may be generated according to the technique of FIG. 3. In contrast to current typical magnets, this magnet allow for better control of the magnetic field because, in accordance with the techniques described herein, more of the magnetic field can be directed to enter (or exit) one surface of the magnet than the opposite surface of the magnet compared with conventional techniques.

Figure 1C:
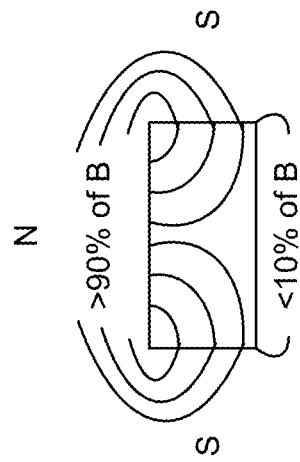
FIG. 1C is a diagram of an embodiment of a three pole magnet having an indentation.
Figure 6:
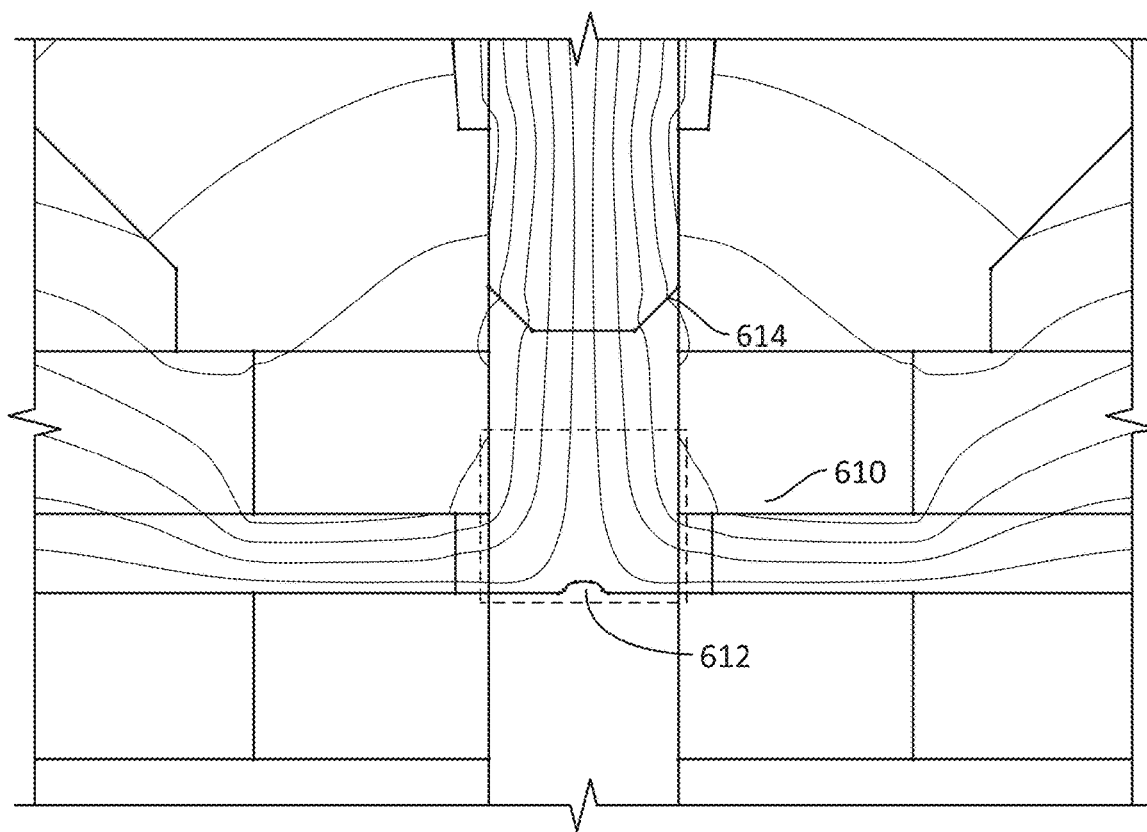
FIG. 6 is a diagram of a magnetic field of a three pole magnet at a beginning of a pressing process according to an embodiment.

FIG. 1C is a diagram of an embodiment of a three pole magnet having an indentation. The magnet of FIG. 1C has the same grain lines as the magnet of FIG. 1A and consequently behaves like the magnet of FIG. 1A. The difference between the magnet of FIG. 1A and the magnet shown here is an indentation 102 in which there is no magnet material (e.g., a divot, notch, depression, etc.). In some embodiments, it may more difficult to optimally align the grains of the magnet material on one of the surfaces of the magnet (e.g., the bottom surface in the example shown in FIG. 1C). Some magnet material may be removed from the surface through which it is more difficult to align the grains of the magnet material (e.g., the bottom surface in FIG. 1C) without affecting the performance of the magnet while saving on the cost of production because less material is used. In the example shown in FIG. 1C, magnet material is not present in the indentation 102. In addition, the indentation provides a location where the magnet may be labelled or identified. A magnetic field for a magnet having an indentation is shown in FIG. 6.

Figure 2A:
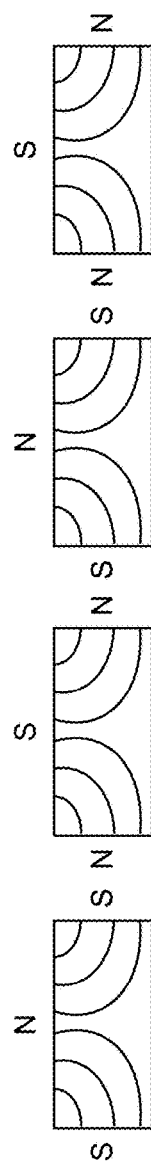
FIG. 2A is a diagram of an embodiment of an array of three pole magnets.

FIG. 2A is a diagram of an embodiment of an array of three pole magnets. In this example, the array includes three magnets. An example of a magnet provided in this array of magnets is shown in FIGS. 1A-1C. In this example, the magnet array is made up of two types of magnets: a first type that has a single north pole at top and a south pole on each side adjacent to the top and a second type that has a single south pole at top and a north pole on each side adjacent to the top. The magnets are oriented as shown such that opposite poles would face at a magnet-to-magnet interface on the sides and the poles at the top surfaces alternate between north and south.

Figure 2B:
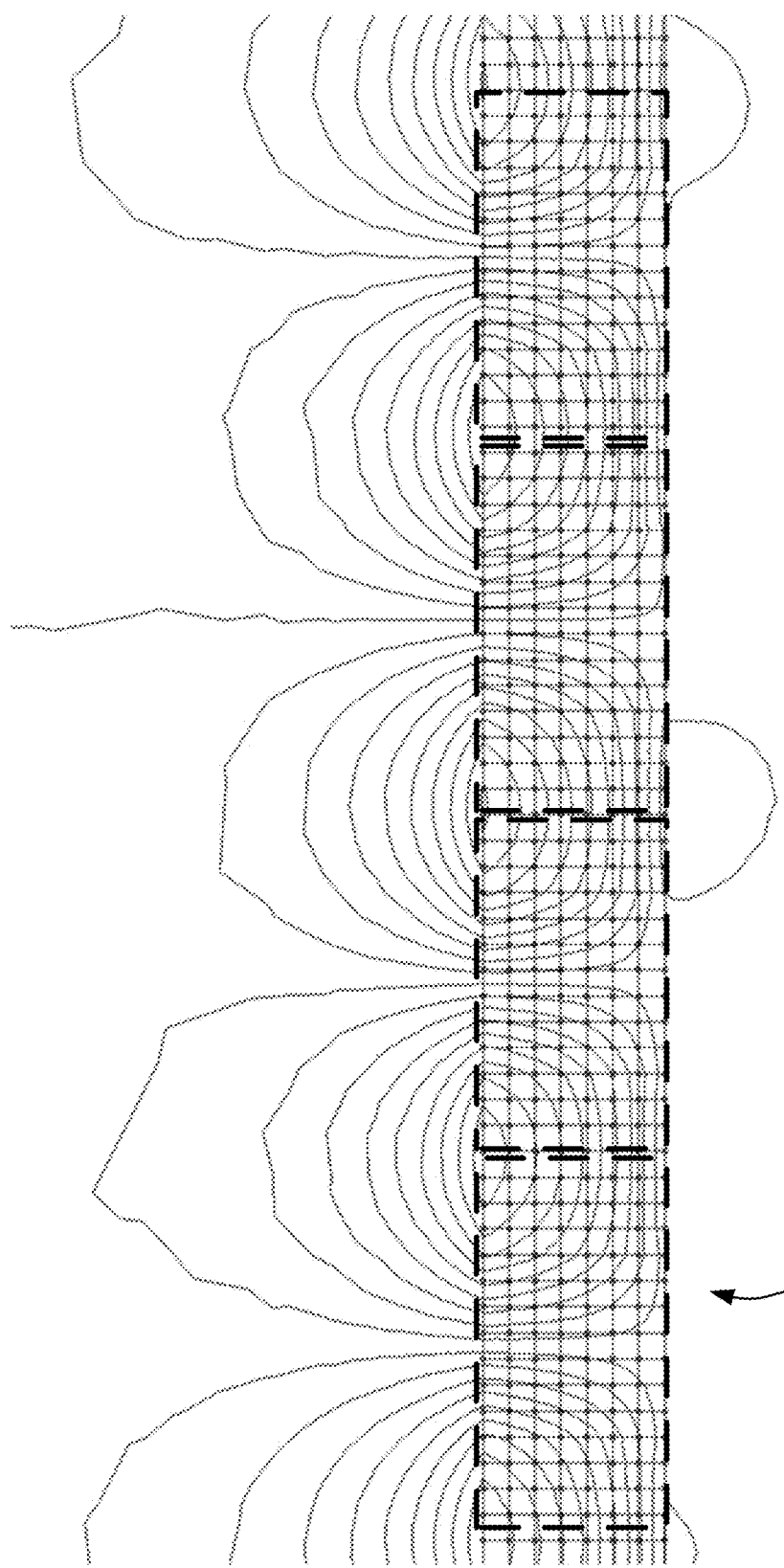
FIG. 2B is a diagram of a magnetic field in a magnet array according to an embodiment.

FIG. 2B is a diagram of a magnetic field in a magnet array according to an embodiment. The magnetic field of the array shown in FIG. 2B corresponds to the magnet array shown in FIG. 2A. Each magnet in the magnet array 226 is represented by a dashed box. In the example shown, substantially all of the magnetic field is on the top side of the array and substantially none (e.g., a negligible amount) of the magnetic field is on the bottom side of the array. A magnetic field of this type may be desirable in application in which a direction magnetic field is preferable. For example, a magnet array with this pattern of magnetic field may replace Halbach arrays. The magnetic field in the magnet array 226 may be produced by joining a plurality of magnets such as the magnet of FIGS. 1A-1C. The magnets in the magnet array may be magnetized after they are placed in this formation or they may be magnetized prior to being placed in this formation.

Figure 3:
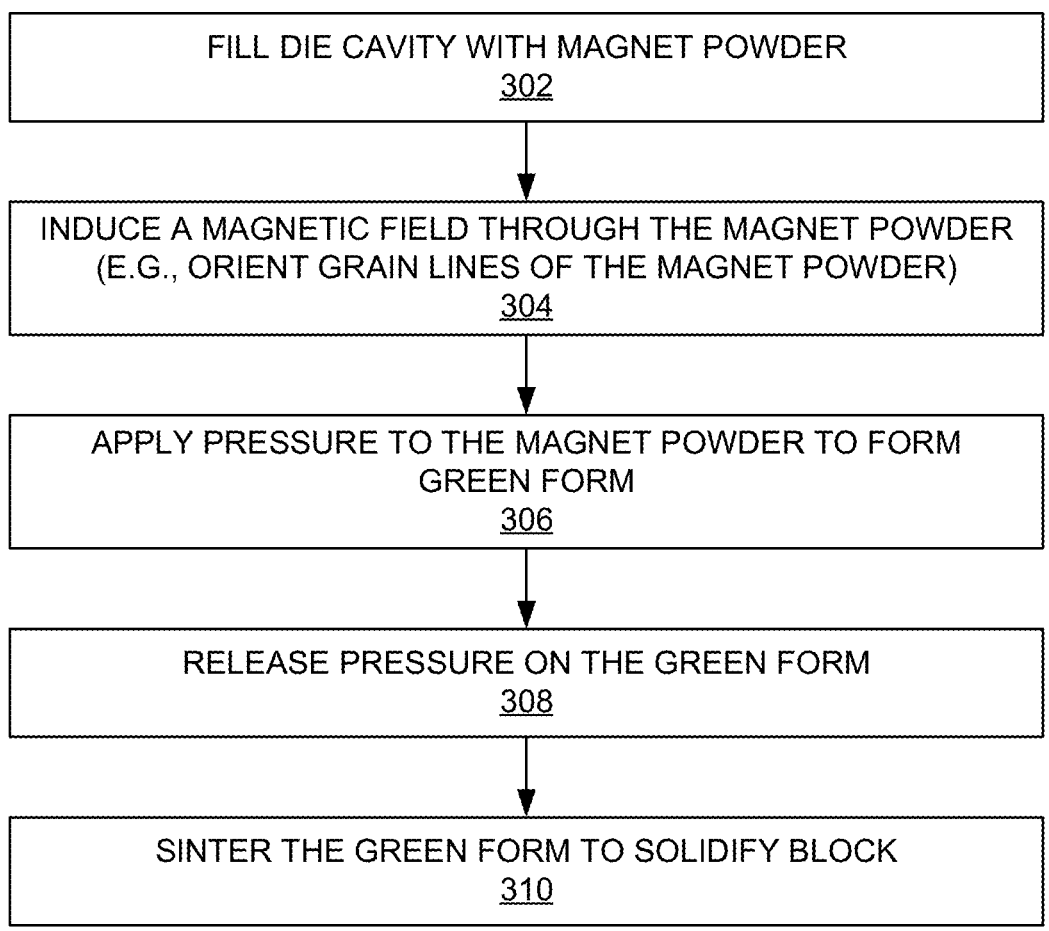
FIG. 3 is a flow chart illustrating an embodiment of a process to manufacture a three-pole magnet.

FIG. 3 is a flow chart illustrating an embodiment of a process to manufacture a three-pole magnet. In various embodiments, the process produces non-magnetized material having a desired grain orientation (also called a "blank"). For example, the process produces a block of material having the grain orientation shown in FIGS. 1A-1C such that the block of material is capable of being magnetized to have three poles.

Figure 8A:
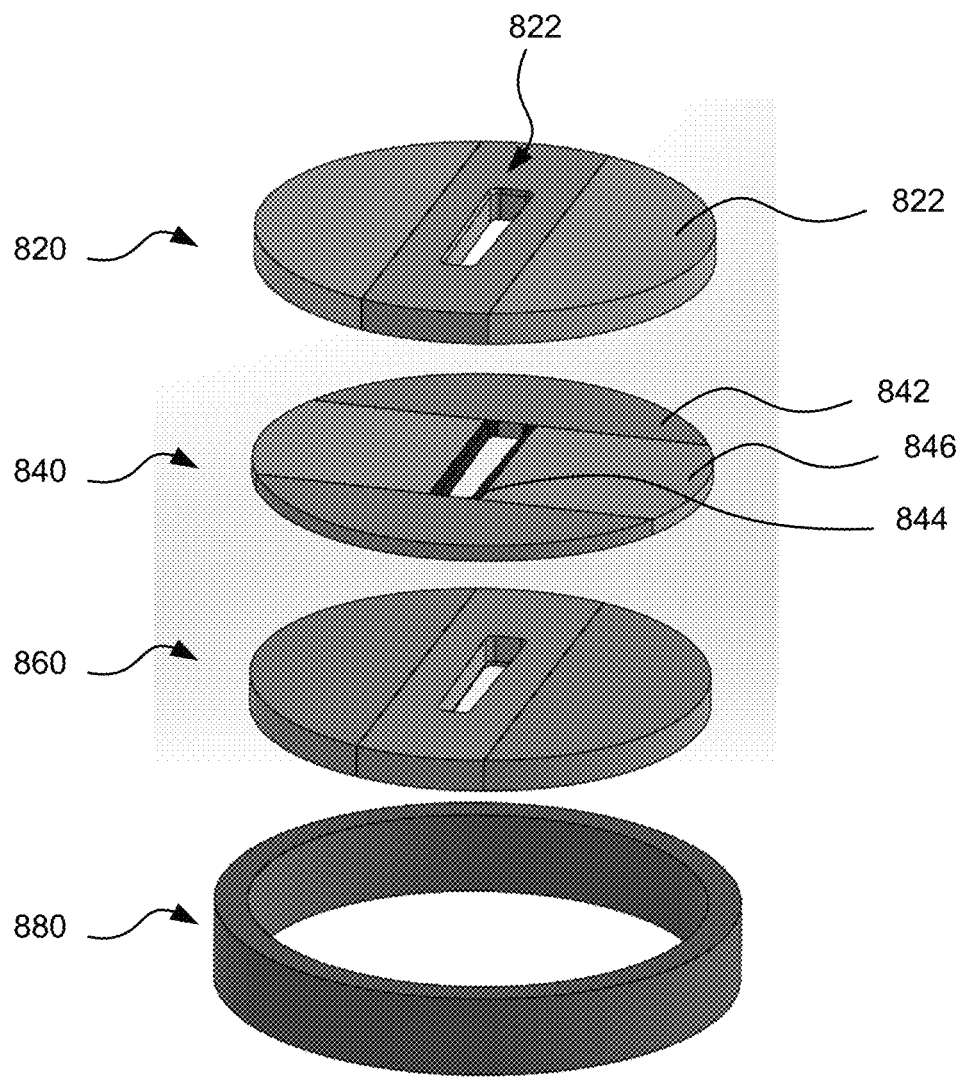
FIG. 8A is a diagram of an embodiment of a die for producing a three pole magnet.
Figure 8B:
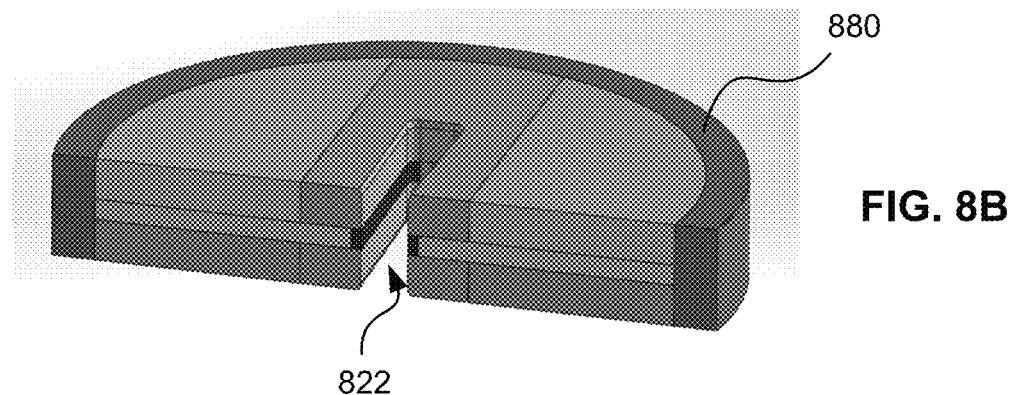
FIG. 8B is a diagram of an embodiment of a die for producing a three pole magnet.

At 302, a die cavity is filled with magnet powder. In various embodiments, the magnet powder includes any material with orientable grains such as neodymium iron boron alloy (NdFeB). An example of a die that can be used to produce a three-pole magnet is shown in FIGS. 8A and 8B. An example of an assembly that can be used for 302 is shown in 1120.1, 1120.2, and 1120.3 of FIG. 11A.

Figure 10:
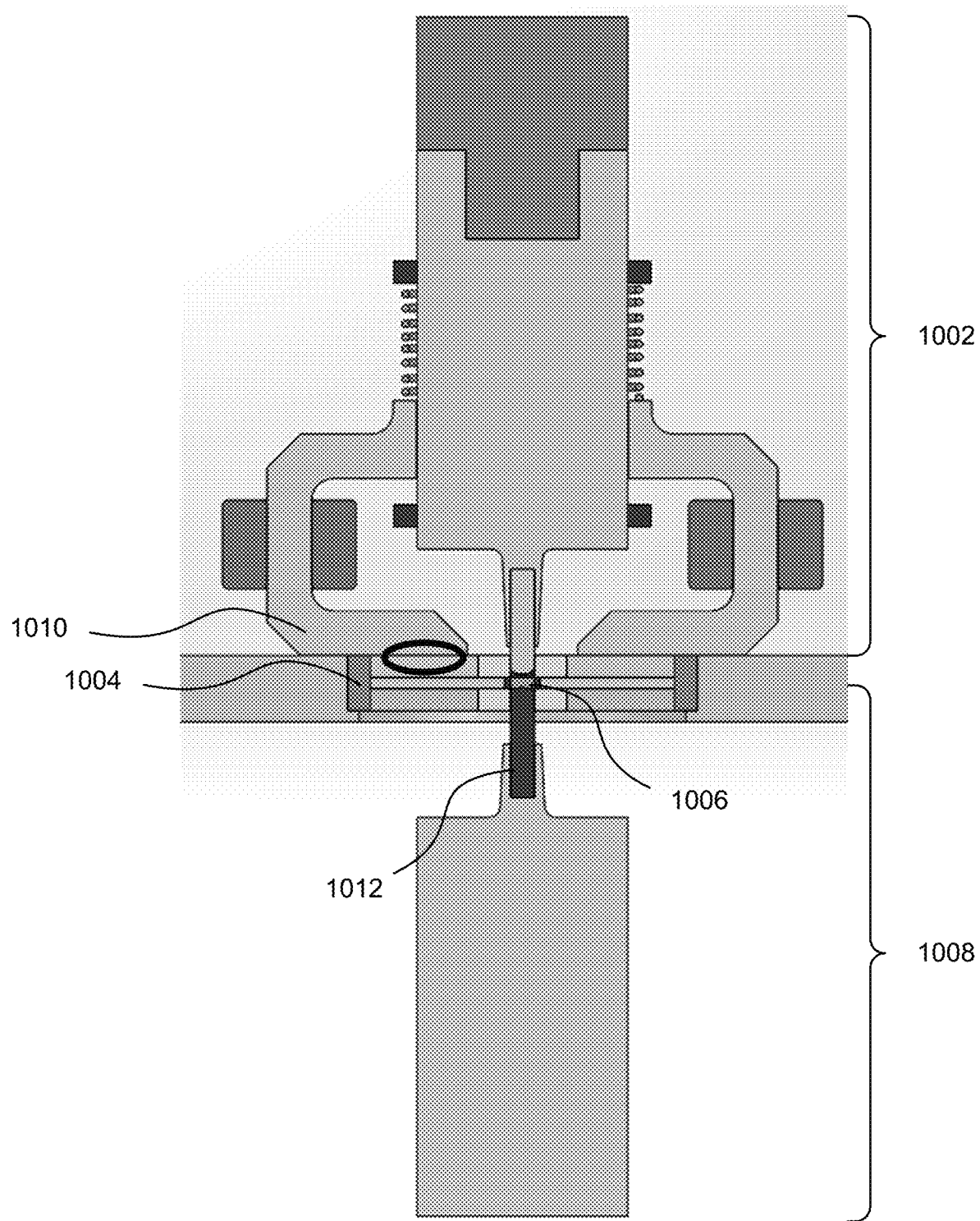
FIG. 10 is a diagram of an embodiment of an assembly for producing a three pole magnet.

At 304, a magnetic field is induced through the magnet powder. The generated magnetic field causes particles in the magnet powder to align along desired easy axis lines. For example, the grains in the magnet powder are subjected to a field having flux lines to which the grains align into the pattern shown in FIGS. 1A-1C. In various embodiments, the magnetic field is induced when a magnetic circuit is closed. An example of an assembly capable of generating a magnetic field is shown in FIG. 10. Example magnetic fields induced through the magnet powder are shown in FIGS. 4-7. In one aspect, it can be easier to magnetize a permanent magnet produced according to the techniques described here because the grain easy axis lines guide the magnetization of the material to produce a permanent magnet. In various embodiments, the magnetic field is pulsed through the magnet powder.

At 306, pressure is applied to the magnet powder to form a green form. In various embodiments, the amount of pressure applied is pre-defined and adjustable. Green form refers to a state of magnet powder after applied pressure causes the powder particles of the magnet powder to fuse together such that when the pressure is released, the magnet powder maintains its form. In various embodiments, a magnetic field is generated (304) and pressure can be applied (306) substantially simultaneously. That is, the magnetic field is pulsed to orient the grain lines along desires easy axes in the magnet powder while pressing the powder. An example of an assembly that can be used for 306 is shown in 1150.1, 1150.2, and 1150.3 of FIG. 11B.

At 308, pressure on the green form is released. In various embodiments, the green form maintains its form upon release of pressure in 306. In some embodiments, the green form is ejected from a die cavity. An example of an assembly that can be used for 308 is shown in 1170.1, 1170.2, and 1170.3 of FIG. 11C.

At 310, the green form is sintered to solidify the block. For example, sintering the green form causes the material to solidify and lock in the easy axis directions. In one aspect, the sintering creates a solid material by joining together the particles of the magnet powder in the green form.

Figure 4:
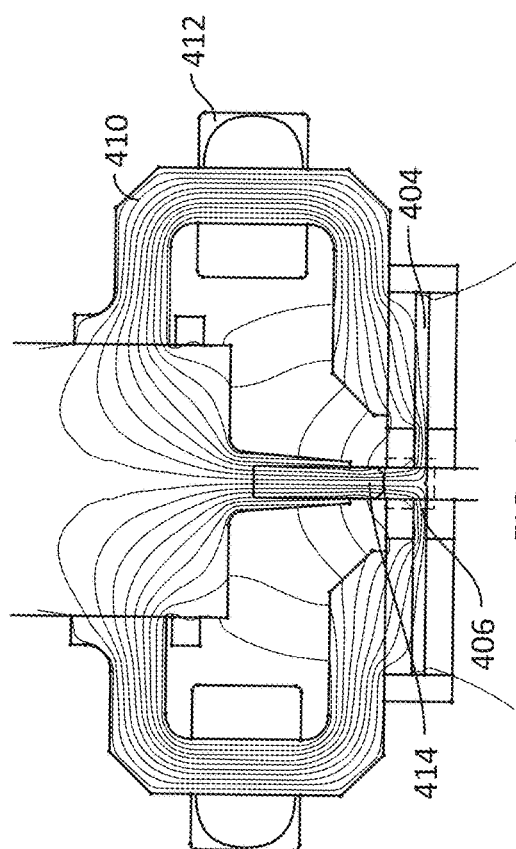
FIG. 4 is a diagram of a magnetic field of an assembly to produce a three pole magnet blank at a beginning of a production process according to an embodiment.

FIG. 4 is a diagram of a magnetic field of an assembly to produce a three pole magnet blank at a beginning of a production process according to an embodiment. The production process is a pre-magnet production process transforms magnet powder into a blank (also referred to as a pre-magnet). The magnet powder is pressed while being subjected to a magnetic field to form a blank with one or more easy axes oriented as desired. Here, the example state shows how flux flows through a magnetic circuit and magnet powder when a magnetic field is initially induced through the magnet powder (304) in accordance with FIG. 3.

The magnet producing assembly includes, among other parts, an armature 410, at least one coil 412, a punch tip 414, and a die 404. The die 404 is adapted to receive magnet powder 406. In various embodiments, the magnet powder is transformed into a permanent magnet according to the techniques described here. The punch tip 414 is adapted to contact the magnet powder 406 to shape the magnet powder and/or to apply pressure to the magnet powder. The armature 410 is adapted to come into contact with the die 404 to form a magnetic circuit. At least one coil is controlled to become energized after the formation of the magnetic circuit. The energized coil(s) induces a magnetic field through the magnet powder such that the powder grains are optimally aligned and remain optimally aligned following completion of pressing process. An example of the magnet producing assembly is shown in FIG. 10.

The example shown in FIG. 4 corresponds to 304 of FIG. 3. Here, a magnetic field is induced but the punch tip 414 is not yet applying pressure on the magnet powder 406. In some embodiments, the magnetic field is induced and the punch tip 414 contact the magnet powder substantially simultaneously such that the magnetic field is induced and pressure is applied to the magnet powder substantially simultaneously. In the example shown, magnetic flux lines within the magnet 406 are orthogonal to the top and side surfaces of the magnet. In some embodiments, in this state, the grain lines are aligned as shown, but might not remain aligned until the pressing process is fully complete. In some embodiments, the amount of flux entering or leaving the bottom surface is negligible.

Figure 5:
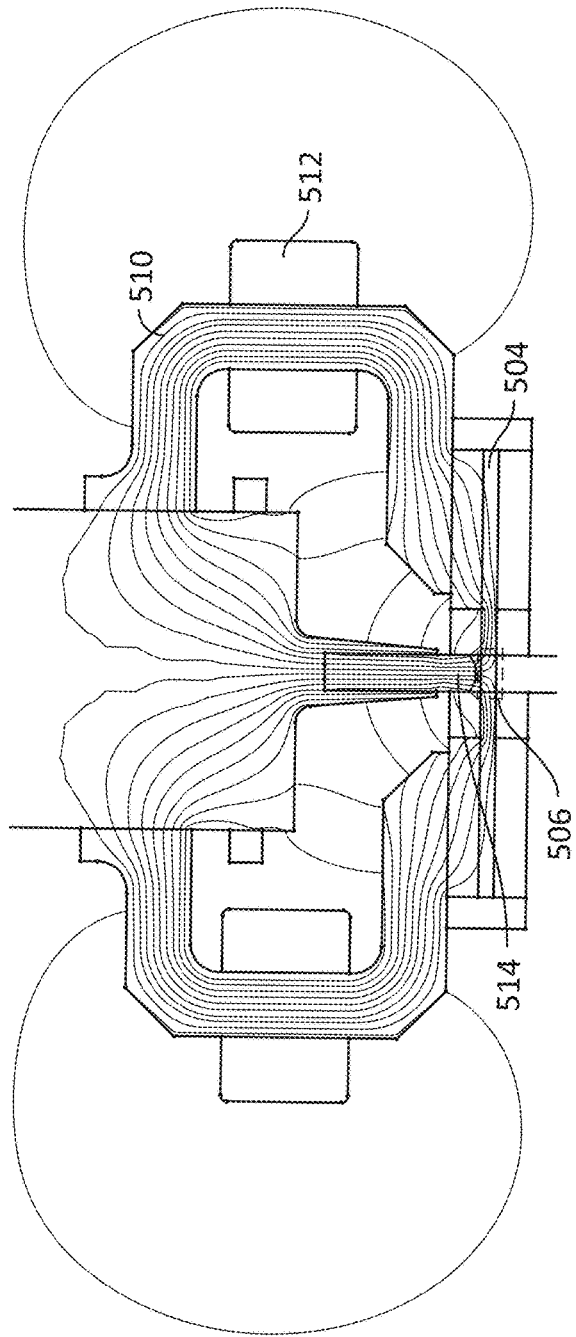
FIG. 5 is a diagram of a magnetic field of a three pole magnet at a completion of a pressing process according to an embodiment.

FIG. 5 is a diagram of a magnetic field of a three pole magnet at a completion of a pressing process according to an embodiment. FIG. 5 shows an example state of a pressing assembly and magnet powder when pressing is completed. Here, the example state shows how flux flows through a magnetic circuit and magnet powder at the completion of the induction of a magnetic field through the magnet powder (304) in accordance with FIG. 3. For example, FIG. 5 is the result of the end of a single pulse or the end of a series of pulsing.

The pressing assembly includes, among other parts, an armature 510, at least one coil 512, at least one punch tip 514, and a die 504. The die 504 is adapted to receive magnet powder 506. Each of these components may function like the corresponding components described in FIG. 4 unless otherwise described. An example of the magnet producing assembly is shown in FIG. 10.

Unlike the assembly shown in FIG. 4, the punch tip 514 is in contact with the magnet powder 506. For example, the punch is applying pressure to the magnet powder while the magnetic field is induced through the magnet powder. The example shown in FIG. 4 corresponds to 304 and 306 of FIG. 3. In the example shown, magnetic flux lines within the magnet 506 are orthogonal to the top and side surfaces of the magnet. In some embodiments, the powder gains in the magnet 506 are optimally aligned will remain optimally aligned even when pressing terminates. In some embodiments, the amount of flux entering or leaving the bottom surface is negligible.

FIG. 6 is a diagram of a magnetic field of a three pole magnet at a beginning of a pressing process according to an embodiment. FIG. 6 is a close up view of FIG. 4 to illustrate the block of material being pressed and surrounding areas. In this example, a punch tip 614 does not fully contact the magnet 610. That is, the magnetic field is generated, but pressure is not applied to the magnet. In the example shown, magnetic flux lines within the magnet 610 are orthogonal to the top and side surfaces of the magnet.

In the example shown in FIG. 6, the magnet 610 includes an indentation 612. For example, the bottom punch in this area creates an indentation such that there is no magnet material in the indentation. Some magnet material may be removed from the surface through which it is more difficult to align the grains of the magnet material (e.g., the bottom surface of magnet 610) without affecting the performance of the magnet while saving on the cost of production because less material is used. In addition, the indentation provides a location where the magnet may be labelled or identified. For example, the identification may register the magnet block when it is becomes part of a magnet array.

Figure 7:
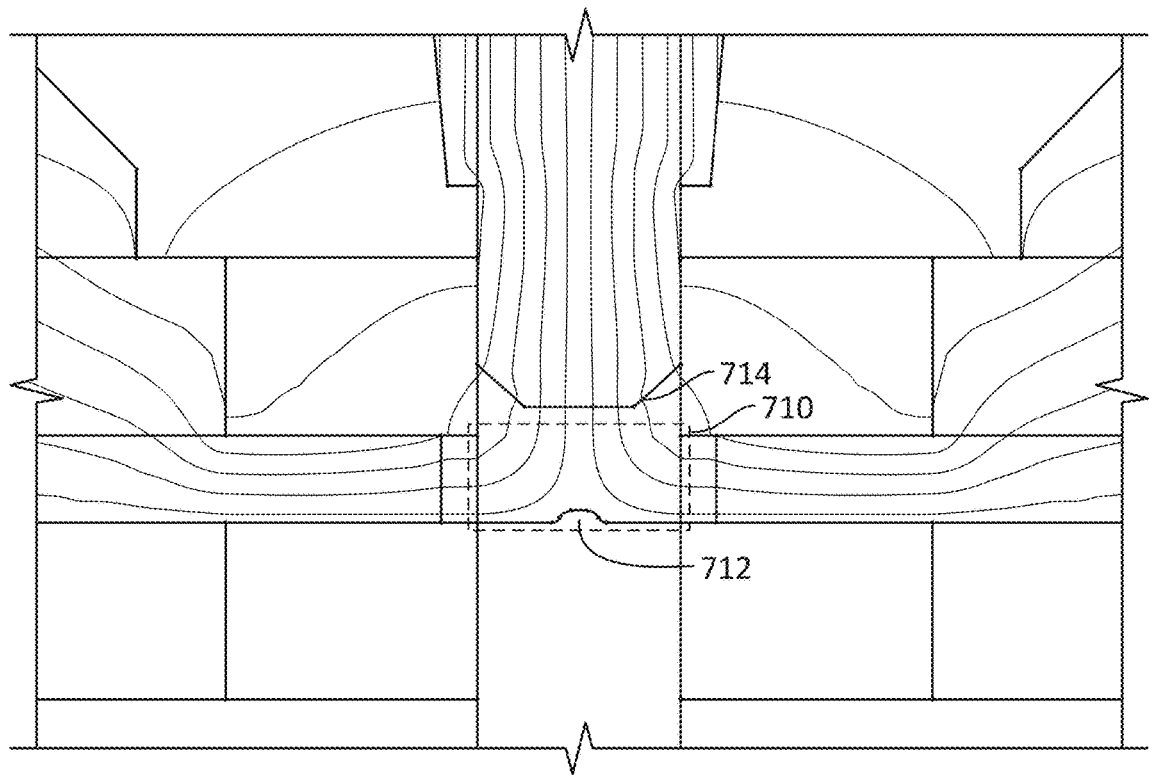
FIG. 7 is a diagram of a magnetic field of a three pole magnet at a completion of a pressing process according to an embodiment.

FIG. 7 is a diagram of a magnetic field of a three pole magnet at a completion of a pressing process according to an embodiment. FIG. 7 is a close up view of FIG. 5 to illustrate the block of material being pressed and surrounding areas. In this example, a punch tip 714 is contacting the magnet 610. That is, the magnetic field is generated and pressure is applied to the magnet substantially simultaneously. In the example shown, magnetic flux lines within the magnet 710 are orthogonal to the top and side surfaces of the magnet. An indentation 712 in magnet 710 may function like the one described for the magnet 610 of FIG. 6.

FIG. 8A is a diagram of an embodiment of a die for producing a three pole magnet. FIG. 8A is an exploded view of an example die that includes a first disk 820, a second disk 840, a third disk 860, and a ring 880.

In this example, each of the first, second, and third disks includes a cavity 822. When assembled as shown in FIG. 8B, the cavities in each of the disks may be aligned. The cavity can be adapted to receive magnet powder. In some embodiments, the lightly shaded half-moon portions (822) of disk 820 are made of ferromagnetic material such as iron, steel, high cobalt carbide, etc. In some embodiments, the half-moon portions (842) of disk 840 are made of material with low magnetic permeability such as cemented tungsten carbide. That is, the material does not easily support formation of a magnetic field and may function as an insulator during a magnet production process such as the process shown in FIG. 3. The darkly-shaded area (844) surrounding the cavity may be made of material with high magnetic permeability. That is, the material may easily support formation of a magnetic field and facilitate production of a magnet from magnet powder in the cavity during a magnet production process such as the process shown in FIG. 3. The lightly-shaded middle section (846) of disk 840 may be made of ferromagnetic material. In some embodiments, disk 860 is made of material with low magnetic permeability such as cemented tungsten carbide. In various embodiments, the ring 880 holds the disks 820-860 in place by exerting hoop stress due to an interference fit. The ring may be made of a metallic material.

In various embodiments, the die cooperates with a punch to carry out the process of FIG. 3. For example, the die holds magnet powder while a magnetic field is induced through the magnet powder and/or the punch exerts pressure on the magnet powder.

FIG. 8B is a diagram of an embodiment of a die for producing a three pole magnet. FIG. 8B is a cross-sectional view of the example die described in FIG. 8A. The ring 880 may compress the parts together with hoop stress. In some embodiments, the parts inside ring 880 are joined by brazing or glue. In some embodiments, surfaces of cavity 822 are made from abrasion resistant material such as tungsten carbide and the like. This may facilitate production of the magnet and allow green form to be easily removed (e.g., ejected) from the cavity.

Figure 9:
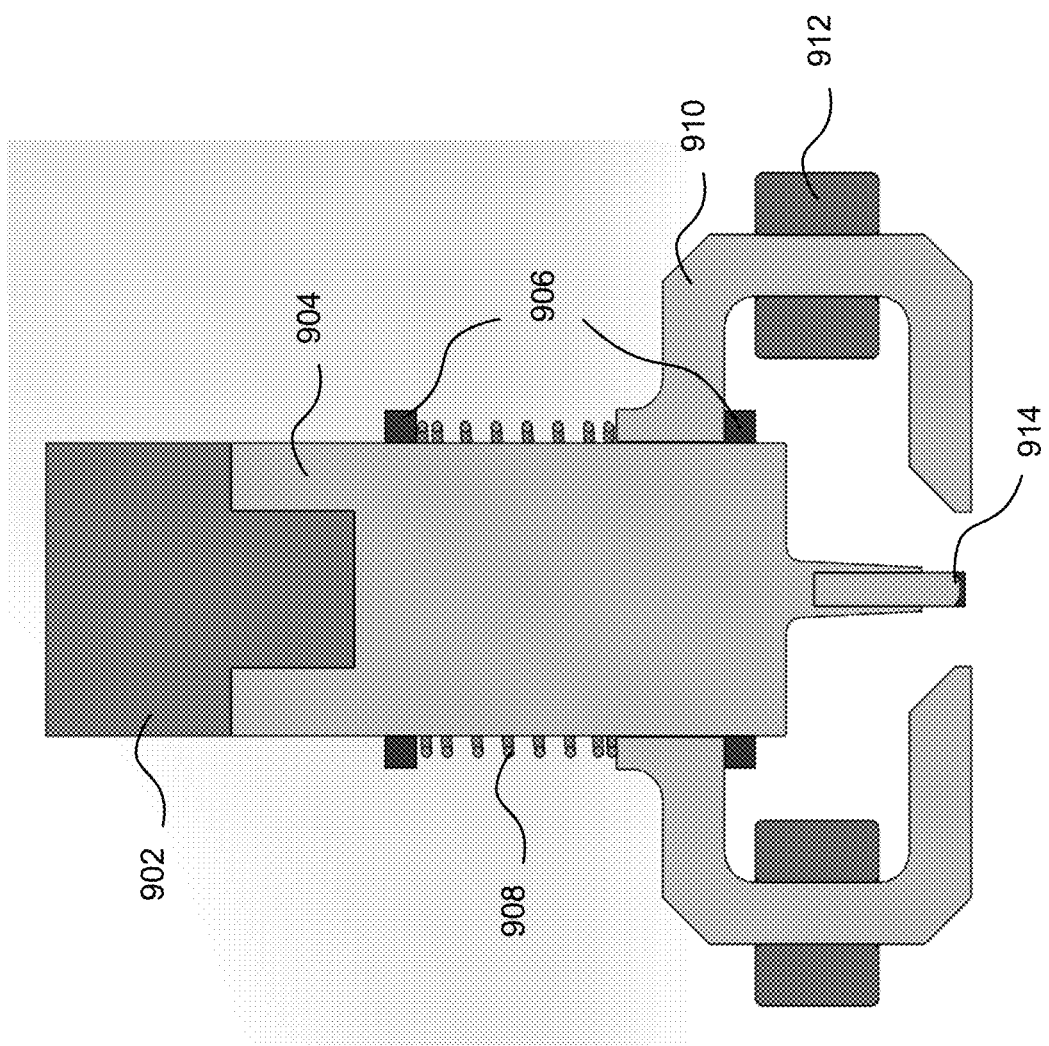
FIG. 9 is a diagram of an embodiment of a punch for producing a three pole magnet.

FIG. 9 is a diagram of an embodiment of a punch for producing a three pole magnet. For example, the punch shown here is an upper punch that is adapted to provide pressure on a top surface of a block of magnet powder during a magnet production process such as the process of FIG. 3. In the example shown, the punch includes a top portion 902, a middle portion 904, at least one travel stop 906, at least one spring 908, armature 910, at least one coil 912, and tip 914.

The top portion 902 may prevent stray magnetic fields generated by coil 912 from propagating elsewhere. For example, the top portion 902 may insulate the rest of a machine in which the punch is provided. In various embodiments, the top portion is made of non-magnetic material such as titanium, austenitic steel, aluminum, brass, etc. The non-magnetic material may prevent stray magnetic fields from leaving a die and/or the punch shown in FIG. 9.

The middle portion 904 may support the tip 914 of the punch and be sized and/or weighted according to production specifications. In various embodiments, the middle portion is made of ferromagnetic material such as iron, martensitic steel, etc.

The at least one travel stop 906 may guide motion of the armature 910. At least one travel stop may be configured to provide a range of motion as needed to produce the magnet described herein. In various embodiments, the travel stop limits the armature from traveling beyond a pre-definable location in either direction.

The spring 908 may assist the motion of the armature 910 and apply pressure on a die such as the die of FIGS. 8A and 8B to complete a magnetic circuit in accordance with a magnet production process such as the process of FIG. 3. The spring may cause the armature 910 to move. The motion of the spring may be limited by the at least one travel stop 906.

The spring loaded armature 910 moves along with the tip of the punch when it is in contact with one of the stops in accordance with a magnet production process such as the process of FIG. 3. In various embodiments, the armature can slide relative to the rest of the punch. In an at-rest position when the armature is separated from the die, the armature may be spring loaded again the lower travel stop as shown.

The at least one coil 912 may energize the armature. In various embodiments, the at least one coil induces a magnetic field through magnet powder provided in a die such as the die of FIGS. 8A and 8B in accordance with the process of FIG. 3. For example, the at least one coil induces a magnetic field through the magnet powder. The induced magnetic field during die pressing may cause sufficient flux in the magnet powder in the cavity to align the powder particles in the desired formation. For example, the amount of flux is around 0.5 T to around 1.5 T. In some instances, the stronger the flux the more strongly powder particles are aligned as they are locked in place during pressing. FIGS. 4-7 show example magnetic field induced through the magnet powder.

The tip 914 may come in contact with magnet powder provided in a die such as the die of FIGS. 8A and 8B in accordance with the process of FIG. 3. For example, the tip shapes and/or compresses the magnet powder. In some embodiments, the tip is made from material of low magnetic permeability. In some embodiments, the tip is made from material of high magnetic permeability. For example, the lightly shaded portion of the tip 914 is made from a high permeability ferromagnetic material such as iron or steel, attached (e.g., brazed or glued) to the darkly shaded portion which is made of high magnetic permeability carbide such as high cobalt cemented tungsten carbide. The carbide on the end of the tip 914 may reduce tool wear caused by the abrasive nature of the magnet powder. The shape of the faying surface between the carbide and iron can be adjusted to improve the distribution of magnetic flux in the magnet powder. The shape of the faying surface can also be adjusted to reduce stress between the iron and carbide parts that may be induced during a pressing process.

FIG. 10 is a diagram of an embodiment of an assembly for producing a three pole magnet. The assembly includes an upper punch 1002, a die 1004, and a lower punch 1008. An example of the upper punch is shown in FIG. 9. An example of the die is shown in FIGS. 8A and 8B. The die 1004 may be configured to receive magnet powder 1006 that becomes a magnet (e.g., an un-magnetized block of material) in accordance with a magnet production process such as the process of FIG. 3.

In some embodiments, the darkly-shaded portion 1012 of the lower punch is made from material of low magnetic permeability. In some embodiments, the portion 1012 is made from material of high magnetic permeability. For example, the portion 1012 is made from low cobalt carbide or high cobalt carbide. The choice of permeability of the lower punch can affect the distribution of flux in the magnet powder during pressing. If a detent is formed in the bottom of the magnet during pressing, a higher permeability carbide lower punch may be used. If there is no detent, a low permeability carbide punch may be sufficient.

The lower punch may be adapted to move relative to the die and upper punch. In some embodiments, the lower punch is fixed to ground and the other components of the assembly move. In other embodiments, the die is fixed to ground and the other components of the assembly move. In other embodiments, the upper punch, lower punch and die all move with respect to the ground.

The armature 1010 of the upper punch 1002 may be spring loaded against the die to complete a magnetic circuit. For example, in FIG. 10 the armature is contact with the die in the circled portion. This allows a magnetic field to be generated at substantially the same time that pressure is applied to the magnet powder (e.g., allowing 304 and 306 of FIG. 3 to occur substantially simultaneously).

Although the armature 1010 is shown as part of the upper punch here, in some embodiments, the armature is instead part of (e.g., wrapped around) the lower punch 1008. This may allow less wire to be used for the at least one coil 912 because the wires for the coil(s) need not accommodate as much motion compared with the armature being provided in the upper punch. In some embodiments, the armature is permanently attached to the die such that there is no need for a spring or travel stops.

Figure 11A:
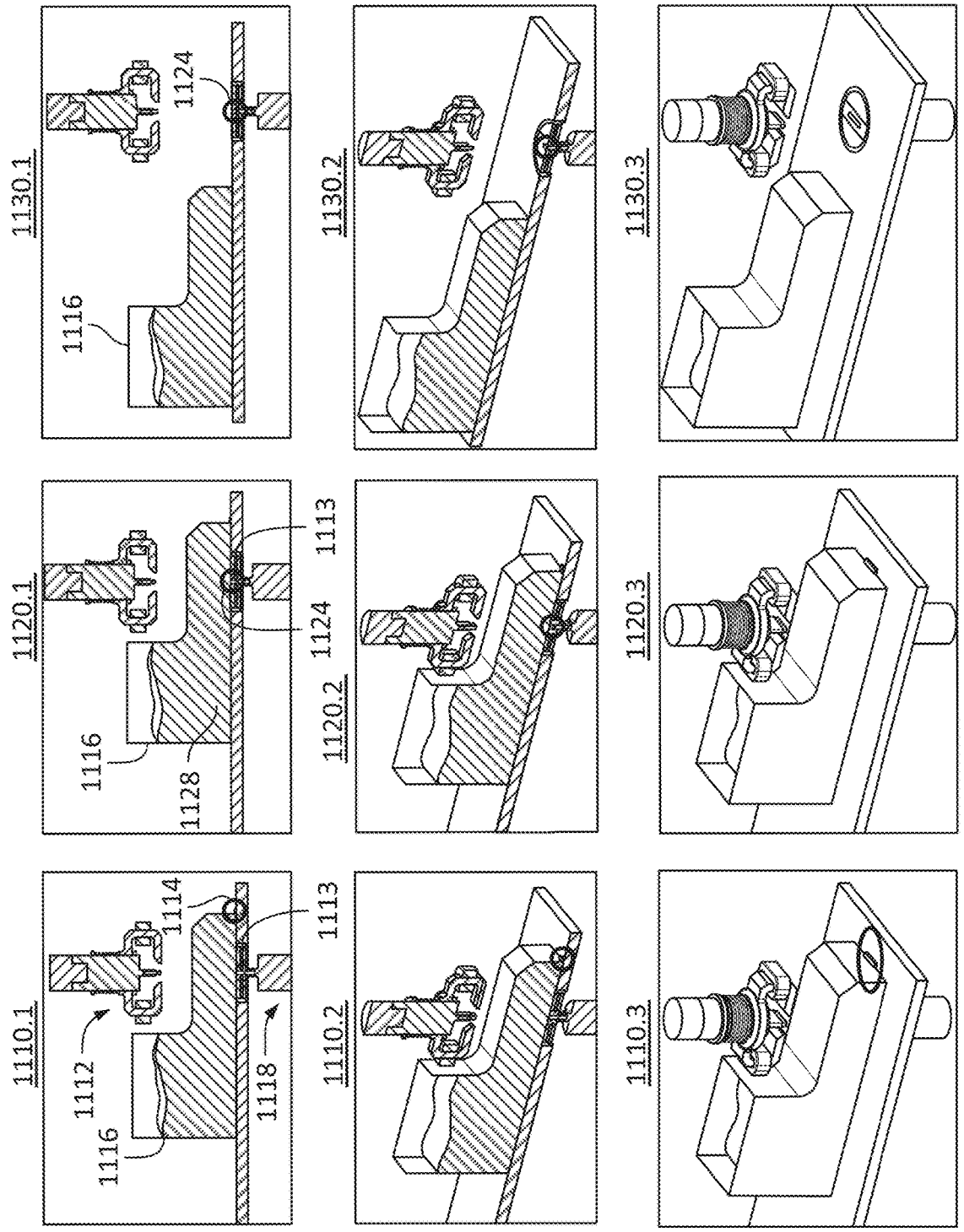
FIG. 11A is a diagram of an embodiment of a process to manufacture a three-pole magnet.

FIG. 11A is a diagram of an embodiment of a process to manufacture a three-pole magnet. The diagram includes three sets of drawings, where each set shows a particular view of the same assembly. A first set (1110.1, 1120.1, and 1130.1) shows a cross-section view of an assembly performing a first portion of the process, a second set (1110.2, 1120.2, and 1130.2) shows a cross-sectional isometric view of the assembly performing the first portion of the process, and a third set (1110.3, 1120.3, and 1130.3) shows an isometric view of the assembly performing the first portion of the process. Each of the drawings in the same column correspond to a same time during the process. For example, 1110.1, 1110.2, and 1110.3 take place at the same time and the three separate drawings are provided as examples to show different views of the assembly. An example process will now be discussed with respect to 1110.1, 1120.1, and 1130.1.

1110.1 shows an initial state of the assembly. The example assembly shown includes upper punch 1112, lower punch 1118, and die 1113. The assembly cooperates with hopper 1116 to produce a three-pole magnet. In the initial state, upper punch 1112 and lower punch 1118 are respectively positioned above and below the hopper 1116, ready to begin the process of manufacturing a three-pole magnet. In some embodiments, previously-produced green form 1114 is pushed out of the way when the hopper moves into its current position. The green form 1114 was produced in a previous cycle. When the hopper 1116 shifts from the left side of the drawing (not shown) to its current position shown in 1110.1, the green form 1114 is pushed to the position shown in 1110.1. In some embodiments, the green form then proceeds to a sintering oven (not shown).

In 1120.1, magnet powder fills a cavity 1124 of the die 1113. For example, magnet powder 1128 from the hopper 1116 fills the die cavity. In some embodiments, the lower punch moves down to allow the magnet powder to fill the die cavity. In some embodiments, the die and table move up to allow the magnet powder to fill the die cavity.

1130.1 shows a state of the assembly in which die cavity 1124 contains an appropriate amount of magnet powder and hopper 1116 slides out of the way to its current position. In various embodiments, when the hopper 1116 slides from between the upper punch and the lower punch out of the way, any excess powder in the vicinity of the die cavity is scraped off. This may allow for fine control of the magnet powder provided to the die cavity during the manufacturing process. In various embodiments, 1120.1 and 1130.1 are examples of filling a die cavity with magnet powder (302) of FIG. 3.

Figure 11B:
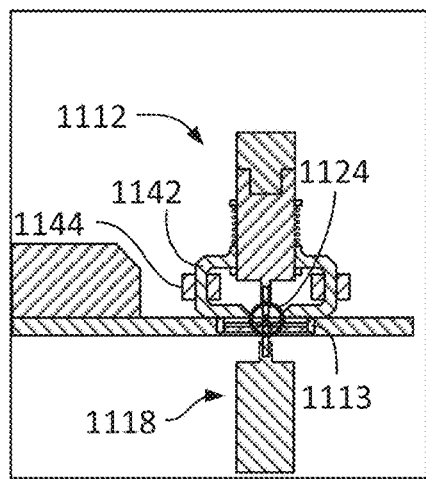
FIG. 11B is a diagram of an embodiment of a process to manufacture a three-pole magnet.
Figure 11B:
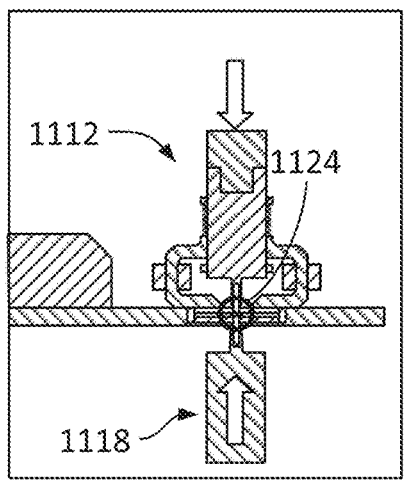
Figure 11B:
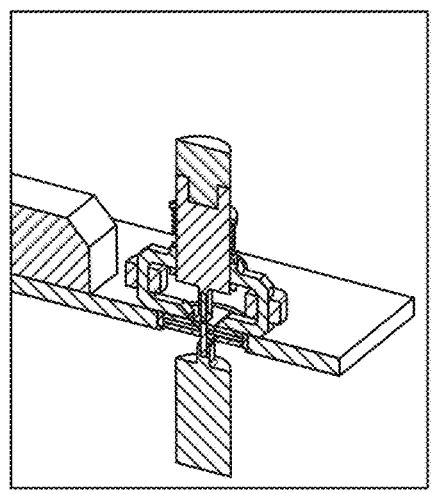
Figure 11B:
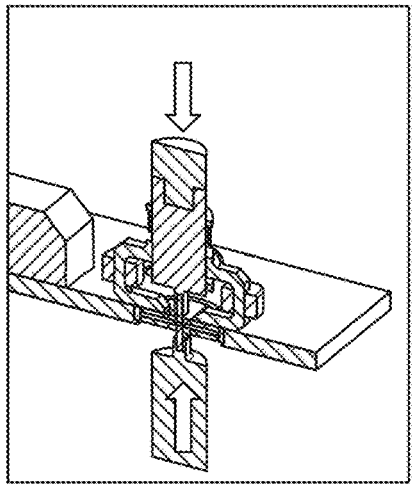
Figure 11B:
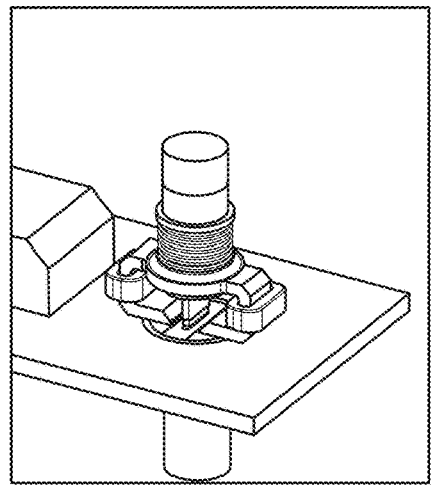
Figure 11B:
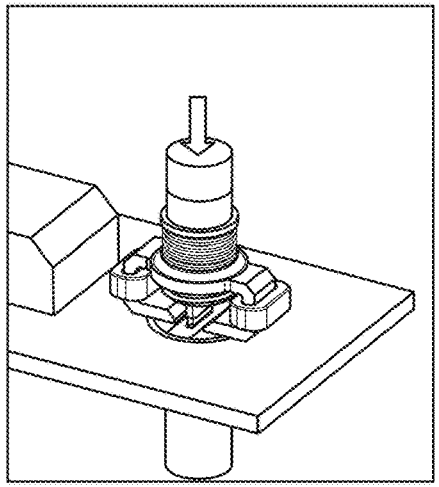

FIG. 11B is a diagram of an embodiment of a process to manufacture a three-pole magnet. In various embodiments, the process shown in FIG. 11B occurs after the process shown in FIG. 11A. The diagram includes three sets of drawings, where each set shows a particular view of the same assembly. A first set (1140.1 and 1150.1) shows a cross-section view of an assembly performing a first portion of the process, a second set (1140.2 and 1150.2) shows a cross-sectional isometric view of the assembly performing the first portion of the process, and a third set (1140.3 and 1150.3) shows an isometric view of the assembly performing the first portion of the process. Each of the drawings in the same column correspond to a same time during the process. For example, 1140.1, 1140.2, and 1140.3 take place at the same time and the three separate drawings are provided as examples to show different views of the assembly. An example process will now be discussed with respect to 1140.1 and 1150.1.

In 1140.1, the upper punch 1112 is lowered such that a magnetic circuit is closed. For example, the armature 1142 contacts the die 1113 to form the magnetic circuit. In various embodiments, the lowering of the upper punch spring loads the armature 1142 against the die 1113. In various embodiments, upon forming the magnetic circuit, at least one coil 1144 is energized to create a magnetic field. An example of an assembly for forming the magnetic circuit is shown in FIG. 10. An example of a magnetic field initially created when the magnetic circuit is closed and the at least one coil is energized is shown in FIGS. 4 and 6. In various embodiments, magnet powder in the die cavity 1124 is compressed in the cavity (e.g., shifted farther down the die cavity). For example, the lower punch 1118 is lowered. As another example, the die 1113 and table move up to allow the powder to be compressed. In various embodiments, 1140.1 is an example of inducing a magnetic field through the magnet powder (304) of FIG. 3.

In 1150.1, the upper punch 1112 and/or the lower punch 1118 are pressed to apply pressure on the magnet powder in the die cavity 1124. For example, the upper and lower punches are pressed together to reach a threshold pressure within the powder. The threshold pressure (e.g., around 5,000 psi to 50,000 psi) is sufficient to cause the powder particles to fuse together. In various embodiments, the result of applying pressure to the magnet powder is a green form. The green form may be strong enough to hold its form when the pressure is released. In some embodiments, the powder volume is reduced when it is pressed into green form. For example, the powder volume is reduced by about a factor of two when it is pressed into the green form. The arrows shown in 1150.1 are example directions of applied force. Force may be applied in a downward direction by the upper punch, an upward direction by the lower punch, or a combination of both directions. In various embodiments, 1150.1 is an example of applying pressure to the magnet powder to form a green form (306) of FIG. 3.

Figure 11C:
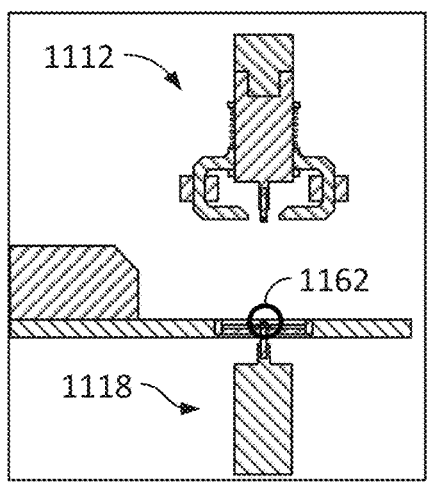
FIG. 11C is a diagram of an embodiment of a process to manufacture a three-pole magnet.
Figure 11C:
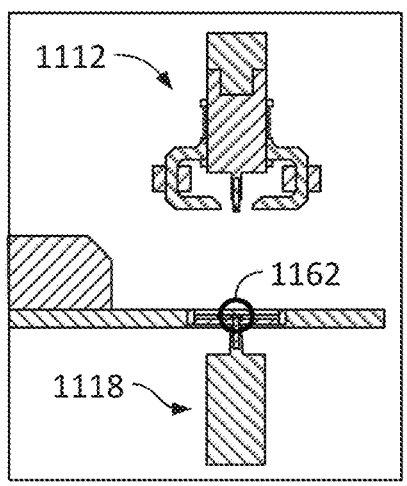
Figure 11C:
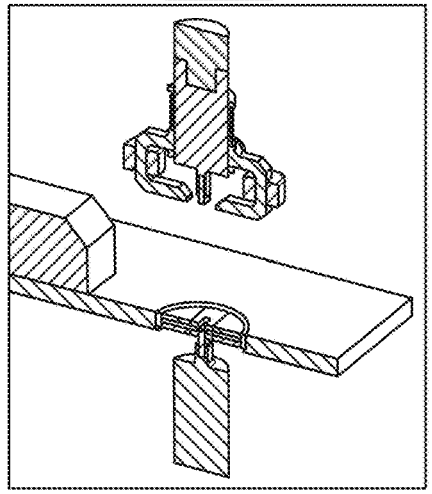
Figure 11C:
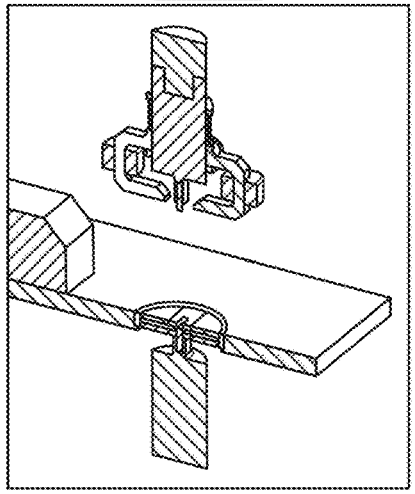
Figure 11C:
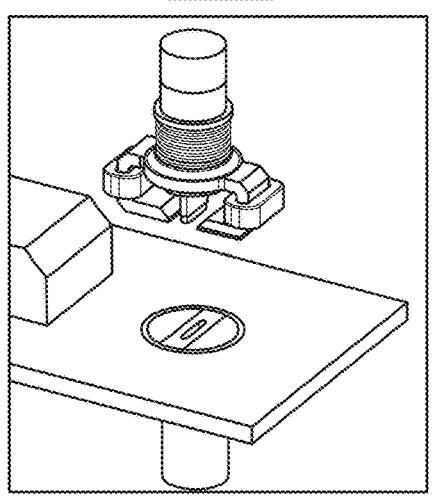
Figure 11C:
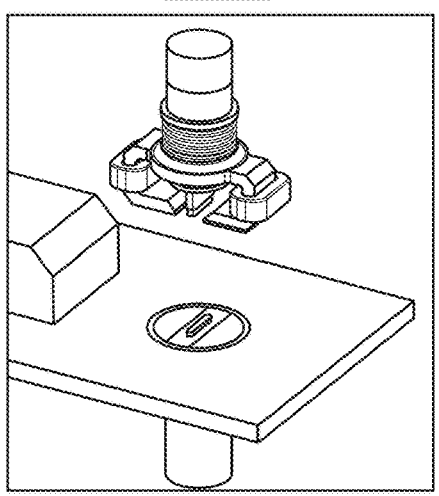

FIG. 11C is a diagram of an embodiment of a process to manufacture a three-pole magnet. In various embodiments, the process shown in FIG. 11C occurs after the process shown in FIG. 11B. The diagram includes three sets of drawings, where each set shows a particular view of the same assembly. A first set (1160.1 and 1170.1) shows a cross-section view of an assembly performing a first portion of the process, a second set (1160.2 and 1170.2) shows a cross-sectional isometric view of the assembly performing the first portion of the process, and a third set (1160.3 and 1170.3) shows an isometric view of the assembly performing the first portion of the process. Each of the drawings in the same column correspond to a same time during the process. For example, 1160.1, 1160.2, and 1160.3 take place at the same time and the three separate drawings are provided as examples to show different views of the assembly. An example process will now be discussed with respect to 1160.1 and 1170.1.

In 1160.1, pressure is released on the green form 1162. This may allow the green form to be removed from the die cavity. In various embodiments, 1160.1 is an example of releasing pressure on the green form (308) of FIG. 3. In this example, the upper punch 1112 is moved out of the way, but it is also possible to release pressure without moving the upper punch out of the way. For example, the upper punch may be positioned as shown in 1140.1 of FIG. 11B without applying any pressure to the die cavity.

In 1170.1, the green form 1162 is removed from the die 1113. For example, the green form is ejected by moving the lower punch 1118 up. As another example, the green form is ejected by moving the die and table down. Following 1170.1, the green form may be pushed out of the way by the hopper. An example of a green form being pushed out of the way is the green form 1114 shown in 1110.1 of FIG. 11A. As described herein, the green form may then proceed to a sintering oven to become solidified. For example, the green form is sintered to make the block of material a solid magnet material.

In various embodiments, the procedures shown in FIGS. 11A-11C may be repeated to produce green forms in sequence. It is also possible to provide a plurality of the assemblies shown to produce green forms in parallel.

Figure 12B:
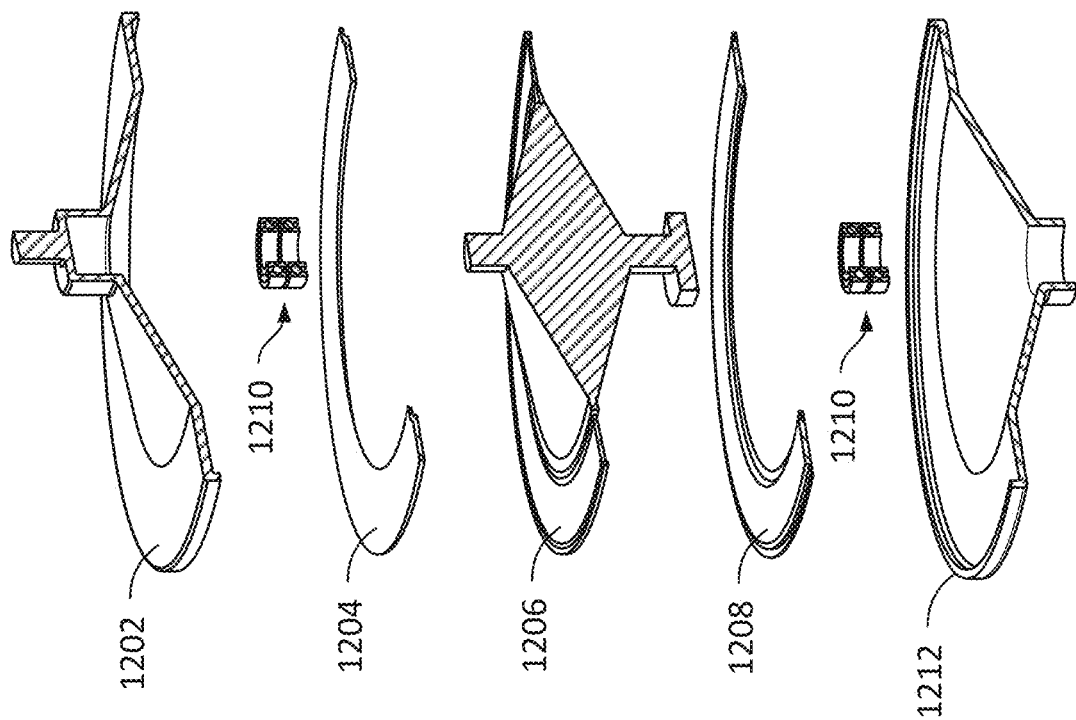
FIG. 12B is a cross-sectional exploded view of the motor.
Figure 12A:
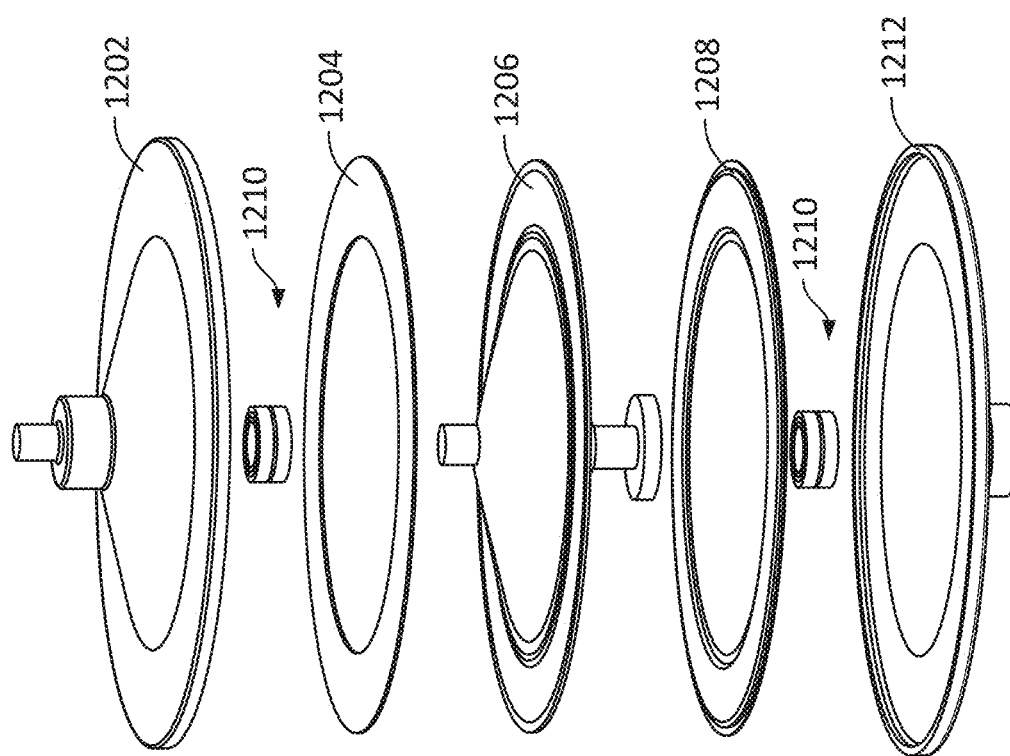
FIG. 12A is a diagram of an embodiment of a motor including an array of magnets according to an embodiment.

The magnet described here finds application in a variety of application including magnet arrays and electric motors. FIG. 12A is a diagram of an embodiment of a motor including an array of magnets according to an embodiment. The magnet array includes at least one magnet produced according to techniques described here. FIG. 12A is an exploded view of the motor. FIG. 12B is a cross-sectional exploded view of the motor. Here, the example brushless motor includes a full flat circular array of magnets. The motor includes an upper rotor housing 1202, an upper magnet array 1204, a stator 1206, a lower magnet array 1208, a lower rotor housing 1212 and a plurality of bearings 1210.

The upper rotor housing 1202 and the lower rotor housing house 1212 respectively house the upper and lower rotors. In this example, the rotors are implemented by the magnetic array described herein. The example upper rotor housing is shown with an output shaft on top. The upper magnet array 1204 may have substantially all of its magnetic field facing downwards. The lower magnet array 1208 may have substantially all of its magnetic field facing upwards. The stator 1206 may include wire winding mounted to the stator housing. For example, the stator may include a three phase litz wire winding mounted to the stator housing. The plurality of bearings 1210 controls motion between the upper rotor and the stator and the lower rotor and the stator.

Figure 13:
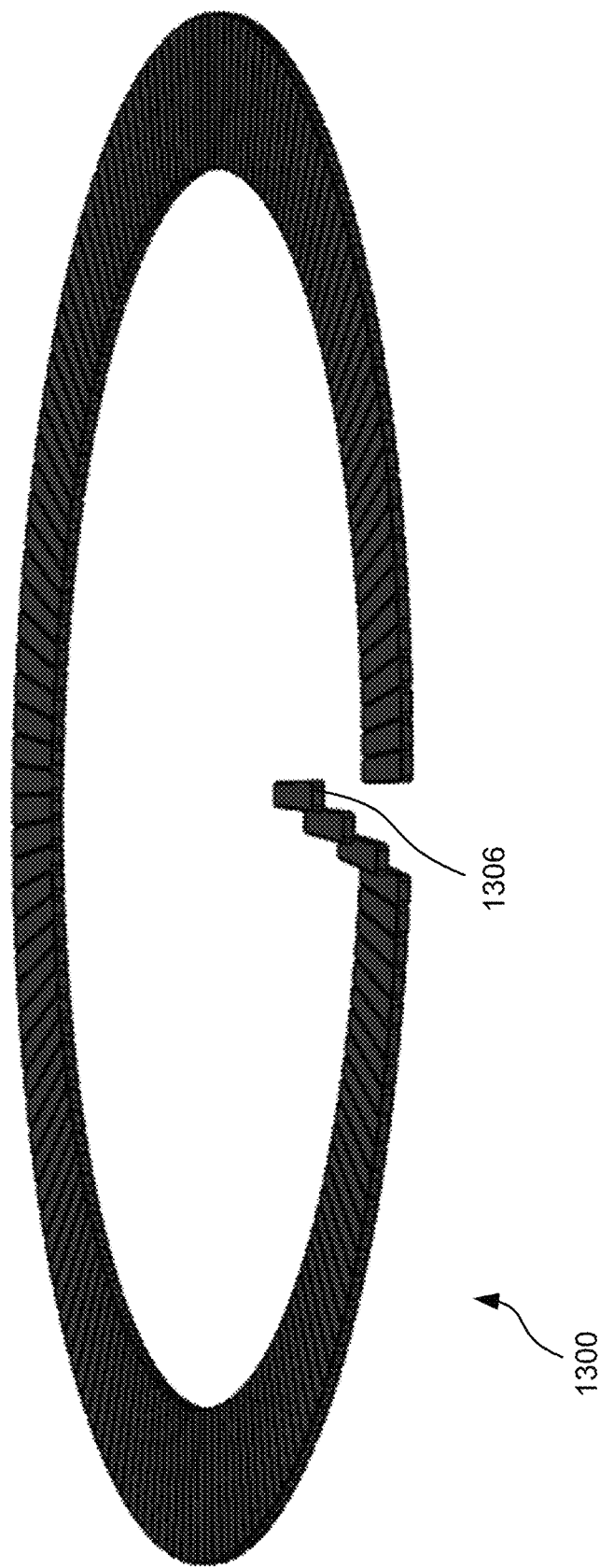
FIG. 13 is a diagram of an embodiment of a magnet array.

FIG. 13 is a diagram of an embodiment of a magnet array. In this example, the magnet array is a flat circular array made up of a plurality of magnets. To illustrate a shape of the individual magnets, some magnets 1306 are shown here lifted away from the array 1300. Individual magnets may be of various shapes. In some embodiments, a magnet 1306 is substantially a sector of a right cylindrical annulus, where a first surface is an upper surface having a shape that is substantially circular or trapezoidal and a second surface and third surface (substantially opposite each other and adjacent top the top surface) are flat rectangular or non-circular surfaces. In some embodiments, a magnet 1306 is substantially a right trapezoidal prism. In various embodiments, the magnets shown in FIG. 13 are sintered blanks that are capable of being magnetized in place.

In contrast to typical current techniques for making magnets, some of the magnets described herein have shapeable magnetic fields. The techniques here allow for fine control of the shape of the magnetic field. In addition, the magnets described here need not have back iron or iron anywhere in the magnetic circuit of motor, which may improve performance and reduce the cost, weight, and/or complexity of manufacturing the magnet. The advantages of the magnets and magnet manufacturing techniques described here also improve the magnet arrays, rotors, motors, and other machines in which they are used.

For example, a sintered blank (e.g., un-magnetized magnet) produced according to the techniques described here can be used to generate a variety of types of magnetized magnets. In one example use case, one sintered blank generates two different types of magnets and is sufficient to produce a magnet array that performs similar to or better than a Halbach array. By contrast, current magnet arrays typically use two types of sintered blanks to yield three different types of magnets. Thus, using the techniques here reduces the complexity and cost of manufacturing magnet arrays.

In addition, using a magnet described here for a magnet array can reduce the number of magnets needed to form an array. In some embodiments, the number of magnets to form an array is half as many as the number of magnets needed for a traditional Halbach magnet array with four magnets per cycle. For example, instead of 308 magnets per array, 154 magnets are used in each array with each magnet being about twice as wide.

The sintered blanks described here are also compatible with co-curing processes in which the magnets are magnetized in place after assembly into a desired configuration. For example, magnet strength is not reduced because heating to assemble the array (which causes magnets to lose strength) is performed prior to magnetization. Also, conventional pick and place robots are compatible with magnet array manufacturing processes using the magnets described here because bulky magnet carriers are unnecessary.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of manufacturing a magnet, comprising:
   transferring magnetic powder into a die cavity defined by a die, wherein the die cavity is defined in part by a die cavity first side surface and a die cavity second side surface, and wherein the die cavity first and second side surfaces are on opposite sides of the die cavity;
   inducing first magnetic flux lines in a first magnetic circuit, wherein the die concentrates and orients the first magnetic flux lines to extend into a first portion of the magnetic powder disposed in the die cavity through the die cavity first side surface and orthogonal to the die cavity first side surface, and wherein the first magnetic flux lines extend out of the first portion of the magnetic powder disposed in the die cavity through a top surface of the magnetic powder disposed in the die cavity;
   inducing second magnetic flux lines in a second magnetic circuit, wherein the die concentrates and orients the second magnetic flux lines to extend into a second portion of the magnetic powder disposed in the die cavity through the die cavity second side surface and orthogonal to the die cavity second side surface, and wherein the second magnetic flux lines extend out of the second portion of the magnetic powder disposed in the die cavity through the top surface of the magnetic powder disposed in the die cavity; and
   applying pressure to the magnetic powder disposed within the die cavity to form the magnet.

2. The method of claim 1, wherein:
   the die comprises a die first magnetically permeable portion that concentrates and orients the first magnetic flux lines to extend into the first portion of the magnetic powder disposed in the die cavity through the die cavity first side surface and orthogonal to the die cavity first side surface; and
   the die comprises a die second magnetically permeable portion that concentrates and orients the second magnetic flux lines to extend into the second portion of the magnetic powder disposed in the die cavity through the die cavity second side surface and orthogonal to the die cavity second side surface.

3. The method of claim 2, wherein:
   the die first magnetically permeable portion extends to a first contact portion of a top surface of the die;
   the first magnetic circuit extends from the die first magnetically permeable portion into an armature first end portion contacted with the first contact portion;
   the die second magnetically permeable portion extends to a second contact portion of the top surface of the die;
   the second magnetic circuit extends from the die second magnetically permeable portion into an armature second end portion contacted with the second contact portion.

4. The method of claim 1, wherein the first magnetic flux lines and the second magnetic flux lines extend through an upper surface of the magnetic powder disposed in the die into an upper punch used to apply the pressure to the magnetic powder disposed within the die cavity.

5. The method of claim 4, wherein the pressure is applied to the magnetic powder disposed within the die cavity using the upper punch and a lower punch that contacts a lower surface of the magnetic powder disposed in the die cavity.

6. The method of claim 5, wherein:
   the lower punch comprises a lower punch tip that contacts the lower surface of the magnetic powder disposed in the die cavity; and
   the lower punch tip is made from a material having a low magnetic permeability.

7. The method of claim 5, wherein:
   the lower punch comprises a lower punch tip that contacts the lower surface of the magnetic powder disposed in the die cavity; and
   the lower punch tip is made from a material having a high magnetic permeability.

8. The method of claim 5, wherein the lower punch forms an indentation in a lower surface of the magnet.

9. The method of claim 1, wherein the pressure is applied to the magnetic powder disposed within the die cavity while the first magnetic flux lines and the second magnetic flux lines extend through the magnetic powder disposed within the die cavity.

10. The method of claim 1, wherein the first magnetic flux lines and the second magnetic flux lines extend through the top surface of the magnetic powder disposed within the die cavity orthogonal to the top surface of the magnetic powder disposed within the die cavity.

11. An assembly for producing a three pole magnet, the assembly comprising:
    an armature comprising an armature first portion and an armature second portion;
    at least one first coil operable to induce first magnetic flux lines within the armature first portion;
    at least one second coil operable to induce second magnetic flux lines within the armature second portion;
    a die having a die cavity defined in part by a die cavity first side surface and a die cavity second side surface, wherein the die cavity first and second side surfaces are on opposite sides of the die cavity, wherein the die is configured to be magnetically coupled with the armature first portion and concentrate and orient the first magnetic flux lines to extend into a first portion of magnetic powder disposed in the die cavity through the die cavity first side surface and orthogonal to the die cavity first side surface, and wherein the die is configured to be magnetically coupled with the armature second portion and concentrate and orient the second magnetic flux lines to extend into a second portion of magnetic powder disposed in the die cavity through the die cavity second side surface and orthogonal to the die cavity second side surface; and a punch assembly magnetically coupled with the armature first portion and the armature second portion, wherein the punch assembly is configured so that the first magnetic flux lines extend through the punch assembly into the first portion of magnetic powder disposed in the die cavity through a top surface of magnetic powder disposed in the die cavity, wherein the punch assembly is configured so that the second magnetic flux lines extend through the punch assembly into the second portion of magnetic powder disposed in the die cavity through the top surface of magnetic powder disposed in the die cavity, and wherein the punch assembly is operable to apply pressure to magnetic powder disposed within the die cavity.

12. The assembly of claim 11, wherein:
the die comprises a die first magnetically permeable portion that concentrates and orients the first magnetic flux lines to extend into the first portion of magnetic powder disposed in the die cavity through the die cavity first side surface and orthogonal to the die cavity first side surface; and
the die comprises a die second magnetically permeable portion that concentrates and orients the second magnetic flux lines to extend into the second portion of magnetic powder disposed in the die cavity through the die cavity second side surface and orthogonal to the die cavity second side surface.

13. The assembly of claim 12, wherein:
the die first magnetically permeable portion extends to a first contact portion of the die;
the first contact portion of the die is configured to be interfaced with the armature first portion to magnetically couple the die first magnetically permeable portion to the armature first portion;
the die second magnetically permeable portion extends to a second contact portion of the die; and
the second contact portion of the die is configured to be interfaced with the armature second portion to magnetically couple the die second magnetically permeable portion to the armature second portion.

14. The assembly of claim 13, wherein:
the first contact portion of the die forms a first portion of a top surface of the die; and
the second contact portion of the die forms a second portion of the top surface of the die.

15. The assembly of claim 11, further comprising a lower punch operable to be interfaced with a lower surface of magnetic powder disposed in the die cavity.

16. The assembly of claim 15, wherein:
the lower punch comprises a lower punch tip configured for contacting the lower surface of magnetic powder disposed in the die cavity; and
the lower punch tip is made from a material having a low magnetic permeability.

17. The assembly of claim 15, wherein:
the lower punch comprises a lower punch tip configured for contacting the lower surface of magnetic powder disposed in the die cavity; and
the lower punch tip is made from a material having a high magnetic permeability.

18. The assembly of claim 15, wherein the lower punch has a protrusion configured to form an indentation in a lower surface of the three pole magnet.

19. The assembly of claim 11, operable to apply pressure to magnetic powder disposed within the die cavity while the first magnetic flux lines and the second magnetic flux lines extend through magnetic powder disposed within the die cavity.

20. The assembly of claim 11, wherein the first magnetic flux lines and the second magnetic flux lines are configured to extend through the top surface of magnetic powder disposed within the die cavity orthogonal to the top surface of magnetic powder disposed within the die cavity.

* * * * *